United States Patent Office 2,719,124
Patented Sept. 27, 1955

2,719,124

GREASE COMPOSITIONS CONTAINING OXONATED ACID SOAPS

Louis A. Mikeska, Westfield, and Arnold J. Morway, Rahway, N. J., assignors to Esso Research and Engineering Company, a corporation of Delaware No Drawing. Application May 15, 1953,
Serial No. 355,404

10 Claims. (Cl. 252—42)

This invention relates to lubricating grease compositions. Particularly the invention relates to novel lubricating grease compositions that are prepared by thickening a lubricating oil base to a grease consistency with a novel grease-forming material. More particularly the invention relates to novel lubricating grease compositions having outstanding structure stability which are prepared by thickening a lubricating oil base to a grease consistency with a metal salt of the product formed by reacting oleic acid or an oleic acid ester with carbon monoxide and hydrogen under high pressures and temperatures in the presence of a cobalt catalyst.

The invention will be specifically defined by reference to the following illustrative examples.

PREPARATION OF N-BUTYL HYDROXYMETHYL OLEATE

A stainless steel bomb was charged with 5.2 moles of n-butyl oleate and 0.2 weight percent of cobalt oleate, percentage being based on the weight of the n-butyl oleate. The bomb was then pressurized to 3500 pounds per square inch with a mixture of equimolar proportions of carbon monoxide and hydrogen. The oxonation reaction was carried out at 175°–185° C. for a period of five hours.

The oxonated product was then hydrogenated at 180° C. under a hydrogen pressure of 3000 pounds per square inch over a period of 16 hours.

The product was then isolated by dissolving it in petroleum ether and washing, first with dilute hydrochloric acid to remove the catalyst, and finally with water to remove the hydrochloric acid. The extract was then dried over sodium sulfate. On removal of the solvent at 100° C. under 2 mm. pressure, the oxonated product was obtained as a viscous light colored oil. It proved to have a saponification number of 169.12 mg. KOH/gm., an acetyl number of 58.2 mg. KOH/gm., and an acid number of 4.06 mg. KOH/gm. Without any additional purification the product was used for the preparation of novel lubricating greases as set out below.

Example 1

500 grams of the oxonated butyl ester was converted to the lithium soap of oxonated oleic acid by boiling with an aqueous solution of 65.5 grams of lithium hydroxide monohydrate, a slight excess over the theoretical amount required. This aqueous mass was then dried in a vacuum oven under reduced pressure to remove butyl alcohol liberated.

50 grams of the soap so prepared was then mixed with 50 grams of lithium stearate and the mixture added to 890 grams of a mineral lubricating oil having a viscoscity at 210° F. of 40 SUS in a small experimental fire-heated grease kettle. The total mixture was then heated to 400° F. with agitation. There was then added 10 grams of phenyl alpha naphthylamine as an antioxidant, and the grease was allowed to cool in 1 inch layers in a cooling pan. The grease, on cooling, formed a very hard, transparent cake which showed no oil separation. The cake was returned to the kettle, worked to a plastic mass, passed through a homogenizer, and then filtered.

Standard ASTM inspections on the grease composition prepared as described above are set out below.

Dropping point (°F.) _____ 350.
Penetrations (77° F., mm./10) unworked.
  Worked (60 strokes) [a] _____ 320.
  Worked (100,000 strokes) [a] ___ 375.
Water solubility (210° F.) _____ Did not dissolve or emulsify in boiling water.

A. F. B. M. A. test [b]:
  1st test 80° F
  2nd test 220° F
  3rd test 250° F

{ Bearings well lubricated. Grease does not tend to throw out of bearing, become fibrous or thin out sufficiently to leak through bearing seals.

[a] Fine hole worked plate 270 1/16" holes.
[b] Anti-Friction Bearing Manufacturers Association Test. A #204 ball bearing is packed with the grease to be tested and run for 1 hour at a rate of 3600 R. P. M. at 3 test temperatures. The bearing lubricant is examined at the end of each test for consistency and leakage.

Example 2

In accordance with the procedure outlined in Example 1 above, the following proportions of ingredients were used in preparation of a second lubricating grease.

| | Weight percent |
|---|---|
| Lithium soap of invention | 4.8 |
| Lithium stearate | 7.2 |
| Mineral oil (55 vis. at 210° F. acid treated coastal type) | 87.0 |
| Phenyl alpha naphthylamine | 1.0 |

This grease composition had the following inspections:

Dropping point (° F.) _____ 375
Penetrations (77° F., mm./10)
  unworked _____ 300
  Worked (60 strokes) _____ 317
  Worked (100,000 strokes) ____ 365
Water solubility (210° F.) _____ Does not dissolve or emulsify in boiling water
Norma Hoffman Bomb Oxidation
  Test (hrs. to 5 p. s. i. drop) ____ 400+

Example 3

According to the procedure of Example 1, a third sample was prepared using the following proportions of ingredients.

| | Weight percent |
|---|---|
| Lithium soap of invention | 5.0 |
| Lithium stearate | 5.0 |
| Di-2-ethyl hexyl sebacate | 89.0 |
| Phenyl alpha naphthylamine | 1.0 |

This synthetic ester based grease formulation gave the following inspections:

Dropping point (° F.) _____ 360
Penetrations (77° F., mm./10) unworked ___ 295
  Worked (60 strokes) _____ 310
  Worked (100,000 strokes) _____ 355
Water solubility (210° F.) _____ None
Norma Hoffman Bomb Oxidation Test (hrs. to 5
  p. s. i. drop) _____ 400+

Example 4

According to the procedure of Example 1, a grease composition was prepared having the following composition:

| | Weight per cent |
|---|---|
| Lithium soap of invention | 10.0 |
| Di-2-ethyl hexyl sebacate | 89.0 |
| Phenyl alpha naphthylamine | 1.0 |

This synthetic ester based grease had the following inspections:

| | |
|---|---|
| Dropping point (°F.) | 360 |
| Penetrations (77° F., mm./10) unworked | 295 |
| Worked (60 strokes) | 320 |
| Worked (100,000 strokes) | 375 |
| Water solubility (210°/F.) | None |
| Norma Hoffman Bomb Oxidation Test (hrs. to 5 p. s. i. drop) | 400+ |

The above data indicate greases of excellent quality and good yield are obtained when employing the soap of this invention as the thickener, in whole or in part, for mineral oil or synthetic fluids.

Although the above given illustrative examples are all based on the use of the lithium soap of the oxonated product of the butyl ester of oleic acid, it is obvious that any of the short chain esters of oleic acid, such as the methyl, ethyl, propyl, butyl, amyl, etc. may be used as a starting material. It is also contemplated that oleic acid alone may be used as the oxonation raw material. In this event, it will be necessary only to neutralize the oxonation product with the desired base and the step of boiling with the caustic solution may not be necessary in some compositions.

The alkali used in the illustrative examples was lithium. However, any of the commonly used soap forming metals may be used. For instance, excellent grease forming soaps may be made by neutralizing the acidic materials of this invention with the hydroxides or oxides of sodium, calcium, barium, strontium, or mixtures of the above. It is also contemplated that soap complexes with other low molecular weight acids such as acetic, furoic, and the like may be utilized. It is to be understood that any of the other commonly used grease forming acids may be substituted for the stearic acid when blends of these are used with the inventive soap. Hydroxy stearic, oleic, tallow fatty acids, or any of the hydrogenated fish oil acids may be utilized in the preparation of the greases of invention.

To thicken the lubricating oil that is used as a base for the grease compositions of this invention, it is preferred to use from about 6% to 20% by weight of soap. As was illustrated above the soap may be a blend of a metallic soap of a high molecular weight fatty acid with the metallic soap of the oxonated product, or the latter alone may be used. When blends are utilized, it is preferred that at least, no less than ⅓ of the total acids be the oxonated acid.

The oil base chosen to prepare the greases of invention may be selected from a wide range of oils. Any of the naturally occurring or synthetic lubricating oils may be used, or blends of these. It is preferred that the lubricating oil have a viscosity within the range of from about 35 to 120 SUS/210° F.; however, oils outside this preferred range may be selected for special purposes. Examples of the oils operable are as follows:

Highly refined aromatic distillates
Highly refined paraffinic distillates
Bright stocks
Dibasic acid esters
Complex esters of gylcols, dibasic acids, alcohols and monobasic acids
Formals
Mercaptals
Hydrogenated olefin polymers
Glycol ethers
Glycol esters
Glycol ether esters
Silicones
Blends of the above Other additive agents may be incorporated in the greases of invention. For instance, tackiness agents, coloring agents, corrosion inhibitors, extreme pressure stabilizers, may be added to enhance specific properties of the grease composition.

To summarize briefly, this invention relates to novel lubricating grease compositions which are prepared by thickening a lubricating oil to a grease consistency with from 6 to 20 weight per cent of the alkali or alkaline earth metal salt of a product formed by the high pressure-high temperature oxonation of a material selected from the class consisting of oleic acid and its esters with short chain alcohols. Preferably the soap thickener is the alkali metal salt of a product formed by subjecting a $C_1$ to $C_6$ alcohol ester of oleic acid to the action of carbon monoxide and hydrogen in the presence of a cobalt catalyst at temperatures within the range of from 150° F. to 450° F. and at pressures within the range of from 1000 to 5000 pounds per square inch, followed by hydrogenation of the product so formed. Especially preferred, and contemplated in the preferred embodiment, are grease compositions prepared by thickening a lubricating oil with from 2% to 20% by weight, based on the weight of the total composition, of the lithium soap of hydroxy methyl oleate. The alkali or alkaline earth metal soaps of high molecular weight fatty acids may also be blended with the oxonated product soaps as described above.

Although the examples described above were based on an oxonated product containing only about 40% of hydroxylated ester, it is possible to separate the hydroxymethyl esters from the unoxonated esters by fractional distillation. For some applications the pure hydroxymethyl esters may be used instead of the unfractionated mixtures obtained as a result of the oxonation process.

What is claimed is:

1. A lubricating grease composition which consists essentially of a lubricating oil base stock thickened to a grease consistency with a metal soap of the hydrogenated reaction product of a material selected from the group consisting of oleic acid and the esters of oleic acid with carbon monoxide and hydrogen in the presence of a cobalt catalyst at temperatures of from 150° F. to 450° F. and pressures of from 1000 to 5000 pounds per square inch.

2. A lubricating grease composition according to claim 1 wherein said metal soap is an alkali metal soap.

3. A lubricating grease composition according to claim 1 wherein said metal salt is the lithium salt.

4. A lubricating grease composition according to claim 1 wherein the material selected from the group is the butyl ester of oleic acid.

5. A lubricating grease composition according to claim 1 wherein the lubricating oil is a mineral oil.

6. A lubricating grease composition according to claim 1 wherein the lubricating oil is a synthetic oil.

7. A lubricating grease composition which consists essentially of di-2-ethylhexyl sebacate thickened to a grease consistency with about 10% by weight, based on the weight of the total composition, of the lithium salt of the product formed by reacting the butyl ester of oleic acid with carbon monoxide and hydrogen in the presence of a cobalt catalyst at a temperature of about 150° F.–450° F. and pressure of about 1000 to 5000 pounds per square inch for about 5 hours, followed by hydrogenation.

8. A lubricating grease composition which consists essentially of a lubricating oil thickened to a grease consistency with a mixture of a metal soap of a high molecular weight fatty acid and a metal soap of the hydrogenated reaction product of a material selected from the group of oleic acid and the $C_1$ to $C_6$ alcohol esters of oleic acid with carbon monoxide and hydrogen in the presence of a cobalt catalyst at temperatures of from 150° F. to 450° F. and at pressures of from 1000 to 5000 pounds per square inch, at least one third of the materials employed to prepare said mixture being said hydrogenated reaction product.

9. A lubricating grease composition according to claim 8 wherein said mixture comprises an equal proportion of the alkali metal soap of a high molecular weight fatty acid and the alkali metal salt of the hydroxy methylated ester formed from the reaction of the butyl ester of oleic acid with carbon monoxide and hydrogen in the presence of a cobalt catalyst at a pressure of about 1000 to 5000 per square inch and at a temperature of from 150° F. to about 450° F.

10. A lubricating grease composition which consists essentially of a lubricating oil thickened to a grease consistency with a metal soap of a material of the class consisting of hydroxy acids and hydroxy acid esters prepared by subjecting a material selected from the class consisting of oleic acid and oleic acid esters to cobalt catalyzed oxonation with carbon monoxide and hydrogen at a temperature within the range of from 150° F. to 450° F. and at a pressure of from 1000 to 5000 pounds per square inch and hydrogenating the oxonated product.

References Cited in the file of this patent

UNITED STATES PATENTS

| | | |
|---|---|---|
| 2,274,673 | Earle | Mar. 3, 1942 |
| 2,566,793 | Davies et al. | Sept. 4, 1951 |